United States Patent [19]

Kleemann

[11] Patent Number: 5,363,536
[45] Date of Patent: Nov. 15, 1994

[54] CLOSING BAND

[75] Inventor: Karl F. Kleemann, deceased, late of Murrhardt, Germany by Margarete Kleemann, legal representative

[73] Assignee: Erich Schumm GmbH & Co. KG, Murrhardt, Germany

[21] Appl. No.: 927,195

[22] Filed: Aug. 7, 1992

[30] Foreign Application Priority Data

Aug. 8, 1991 [DE] Germany .................. 4126225

[51] Int. Cl.⁵ .............................................. B65D 63/10
[52] U.S. Cl. ............................. 24/30.5 P; 24/16 PB
[58] Field of Search ........... 24/16 PB, 30.5 P, 16 R, 24/30.5 R

[56] References Cited

U.S. PATENT DOCUMENTS 3,837,047  9/1974  Bunnell .
3,973,293  8/1976  Noonty ........................ 24/16 PB
4,154,418  5/1979  Wiese .

FOREIGN PATENT DOCUMENTS 1176561  8/1964  Germany .
1189447  3/1965  Germany .
1231614  12/1966  Germany .
2647804  4/1978  Germany .
6400477  3/1966  Netherlands .
1418900  12/1975  United Kingdom .

Primary Examiner—James R. Brittain
Attorney, Agent, or Firm—Quarles & Brady

[57] ABSTRACT

A closing band used for closing bags, sacks or for bundling lines, contains on one end of an elongated, flexible band (1), a holding head (2) with a fixing device for the band. In the vicinity of the facing end the band has a gripping member (3). The band is shaped into a loop and in the vicinity of its free end is engaged with the fixing device of the holding head (2) and is then tightened. By pulling the free end perpendicular to the direction of a passage (9) in the holding head (2) reopening thereof is possible.

10 Claims, 2 Drawing Sheets

CLOSING BAND

FIELD OF THE INVENTION

The invention relates to a closing band such as can e.g. be used for the tying up of bags, for bundling lines or cables, or for closing or sealing packs.

BACKGROUND OF THE INVENTION

For combining lines into bundles cable bands are known, which are provided at one band end with a passage through which can be passed the free, slightly pointed end of the band. The passage is perpendicular to the band direction, so that the passed through part projects. It is not then possible to open the closing band again, so that it is intended and appropriate for a single use only.

In addition, cable binders have been proposed, which can be opened with a tool. However, once again they are not reusable, because here again the projecting part must be cut off.

For the closing of bags numerous different bands are known, but they are generally difficult to close and just as difficult to open again and are consequently frequently destroyed during opening.

SUMMARY OF THE INVENTION

The problem of the invention is to provide a closing band, which can be easily closed and then easily reopened, so that it is suitable for frequent reuse. The easy action is also to be ensured in the case of tolerances resulting from the manufacturing process.

The closing band can be used both for closing bags, sacks or other irregularly shaped objects, as well as for combining cables into bundles. It is frequently necessary to add a further cable when bundling cables.

Through the provision of several, elastically deformable, individual tongues, it is possible to ensure, even in the case of tolerance caused by the manufacturing process, that the band can be easily closed without force having to be exerted. The distribution of the blocking action over several tongues also leads to a higher strength and therefore to an improved possibility of reuse.

According to a further development of the invention the passage is constructed in such a way that in it the band runs roughly parallel to the band area directly adjacent to the holding or retaining head. Therefore the end projecting from the latter no longer projects from the tied object and instead runs parallel thereto and can be applied or joined.

According to a further development of the invention the passage can have a cross-section substantially corresponding to that of the band. When an attempt is made to open the band again by drawing back, which can be caused by reaction forces, the force produced by the tongues is consequently distributed over the entire passage, so that the surface pressure remains low.

According to the invention the tongues can be positioned on a side wall of the passage and in the case of a right-angled cross-section this can more particularly be the longer side.

According to the invention the passage side wall facing the side wall provided with the tongues has a longitudinal slot, i.e. which runs in the longitudinal direction of the band. Said longitudinal slot can be used for facilitating the insertion of the band and for permitting the opening thereof.

In particular, it is possible to provide on the free end of the band a gripping member, e.g. a ring, which can be easily gripped by the user. Both during the opening and the closing of the band, the said gripping member has a facilitating action.

According to the invention behind the gripping member is formed a threading portion with a modified cross-section compared with the remainder of the band. This threading portion facilitates the insertion of the band through the longitudinal slot into the passage.

According to the invention the length of the passage, measured in the longitudinal direction of the band, is greater than the width of the band and is preferably at least twice as large.

When a rib system is provided on one side of the band, it can be constituted by individual ribs, whose spacing corresponds to that of the tongues. The ribs can be arranged in sawtooth-like manner, so as to better cooperate with the inclined tongues.

BRIEF DESCRIPTION OF THE DRAWINGS

Further features, details and advantages of the invention can be gathered from the claims, description of a preferred embodiment of the invention and the attached drawings, wherein show:

DETAILED DESCRIPTION OF THE EMBODIMENTS OF THE INVENTION

Figure 1:
FIG. 1 A side view of a closing band according to the invention.

The closing band shown in FIG. 1 contains an elongated, flexible band 1 of a suitable plastics material. On its left-hand end in FIG. 1 is shaped in one piece a holding head 2 and on its opposite, right-hand end in FIG. 1 is also shaped in one piece a gripping member 3. Immediately behind the gripping member 3 the band has a threading portion 4 in which said band 1 has a somewhat larger thickness than in the remaining area.

Figure 2:
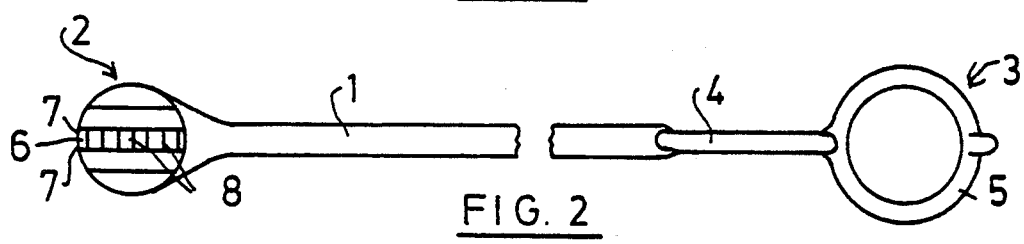
FIG. 2 A plan view of the closing band of FIG. 1.

FIG. 2 shows the plan view of the closing band of FIG. 1 on the same scale. A comparison of the two drawings shows that the band 1 has a greater width than thickness, i.e. a rectangular cross-section. The holding head 2 has a circular outer shape. The gripping member 3 is constructed as a ring 5 through which a user can stick his fingers so as in this way to be able to more easily handle the closing band. FIG. 2 also shows that in the threading portion 4 the band width is smaller than in the remaining area.

The holding head 2 contains on its top surface a longitudinal slot 6, whose width measured between the longitudinal lateral edges 7 is smaller than the width of the band 1 and roughly the same as the width of the threading portion 4. Through the longitudinal slot 6 can be seen individual tongues 8, which extend from a body of the holding head 2 and are used for locking the band.

Figure 3:
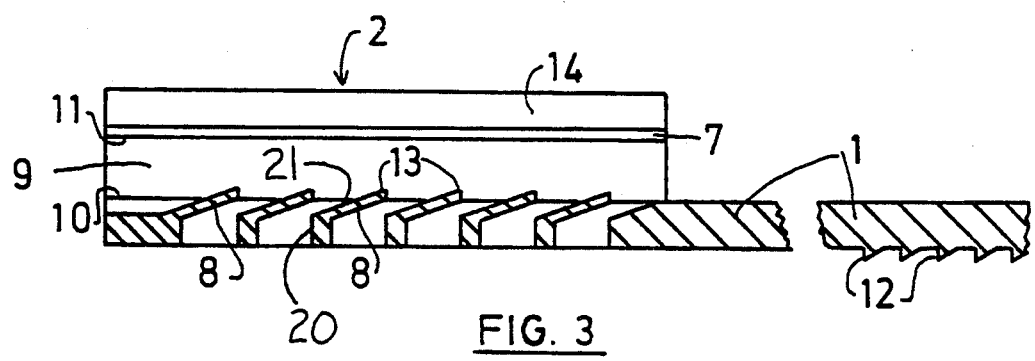
FIG. 3 A partial section through the holding head and the band on a larger scale.

Details of the holding or retaining head 2 can be seen in FIG. 3, which shows a longitudinal section through the holding head 2 in the vicinity of the median longitudinal plane. A channel-like passage 9 for the band 1 is formed in the holding head 2. On one side the passage 9 is bounded by a side wall 10, in the vicinity of which the individual tongues 8 are shaped in one piece. The passage 9 runs parallel to the direction of the unbent band 1. On the side wall 11 facing the side wall 10 and which in FIG. 3 is still visible is provided the longitudinal slot 6, whose lateral edge 7 can also be seen in FIG. 3. The tongues 8 are inclined to the longitudinal direction and in the direction of the end of the holding head 2 on which the band 1 is shaped. They run under an angle of roughly 20° with respect to the longitudinal direction of the passage 9 or the band.

The head 2 forms a plurality of flexible, spaced tongues 8 having webbed portions 20 extending transversely to the channel-like passage 9. The webbed portions 20 are spaced longitudinally along the channel-like passage 9. The tongues 8 have engagement portions 21 that are formed at an obtuse angle to the webbed portions 20 for angling into the channel-like passage 9 with free ends 13 for engaging the ribbed portion 12 of band 1. The head 2 also forms longitudinal lateral edges 7 alongside the channel-like passage 9 to retain the ribbed portion 12 of the band against longitudinal forces but allowing said band 1 to be removed through exertion of a force outwardly through the top opening 6 of the channel-like passage 9.

On the longitudinal side of the band 1 remote from the passage 9 individual ribs 12 are shaped over most of the band 1 and together form a rib system. The ribs have a roughly sawtooth-like configuration and their reciprocal spacing corresponds to the reciprocal spacing of the tongues 8. The sawtooth shape is such that the steep flanks are directed towards the free ends of the tongues 8. The height of the passage 9 measured between the two sides walls 10 and 11 of said passage 9 roughly corresponds to the thickness of the band 1.

Figure 4:
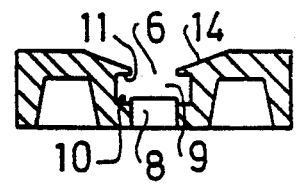
FIG. 4 A cross-section through the holding head on a larger scale.

FIG. 4 shows a cross-section through the holding head 2, which more clearly shows the shape of the passage 9. The passage 9 contains a substantially rectangular cross-section, which corresponds to the rectangular cross-section of the band 1. In the vicinity of the lower side wall 10 are provided the individual tongues 8, whose free edges 13 project over the side wall 10.

The facing side wall 11 has the longitudinal slot 6. On either side of the edges 7 of the longitudinal slot flattened areas 14 are provided outside the passage and these are also visible in FIG. 3.

Figure 5:
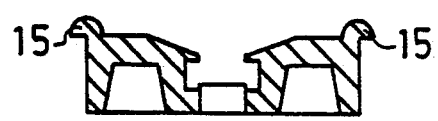
FIG. 5 A cross-section corresponding to FIG. 4 in the case of a slightly modified embodiment of the invention.

FIG. 5 shows an embodiment modified slightly compared with that of FIG. 4, in which projections 15 are shaped in the marginal area of the holding head 2 and in plan view extend over part of the circumference. As the external diameter of the holding head 2 roughly corresponds to the internal diameter of the ring 5, when the closing band is fitted the ring 5 can be engaged over the holding head 2 and be fixed behind the cam-like projections 15.

For fitting the closure e.g. round a sack, its lower side in FIG. 1 is placed on the sack 9. The gripping member 3 is gripped and said end is placed clockwise round the sack neck until a closed circle is formed. The band is placed with its threading portion 4 over the holding head 2 and the threading portion 4 is placed between the edges 7 of the longitudinal slot 6 in the passage 9. As the width of the threading portion is substantially the same as the spacing of the edges 7 this is possible without difficulty. Threading is additionally facilitated by the bevelled areas 14. For closing purposes the ring 5 is pulled, so that now the wider area of the band 1 comes to rest in the passage 9 and is secured there as a result of its shape. On tightening the tongues 8 bend out slightly, so that they almost offer no resistance to the band and closure takes place with a limited force expenditure. On attempting to open the band again, i.e. pull out the band from the passage 9 in opposition to the action of the tongues 8, the free edges 13 of the latter engage on the rib system 12. As the passage 9 is relatively long, the force brought about by the effect of the tongues 8 is exerted on the entire length of the passage 9 and namely on the side wall 11 which is parallel to the side wall 10. Therefore effectively opening of the band is prevented. In order that the closure can be opened again, the user grips on the gripping member 3 and in particular the ring 5. He pulls the band perpendicular to the longitudinal direction of the passage 9. On the end of the passage 9 associated with the free band end, the band is now forced under relatively high surface pressure between the two edges 7 of the longitudinal slot 6 and the holding head is pressed somewhat apart. The band can now be forced completely out of the longitudinal slot by perpendicular pulling without this being prevented by the tongues 8. The reopened closing band can be reused in the same way.

Figure 6:
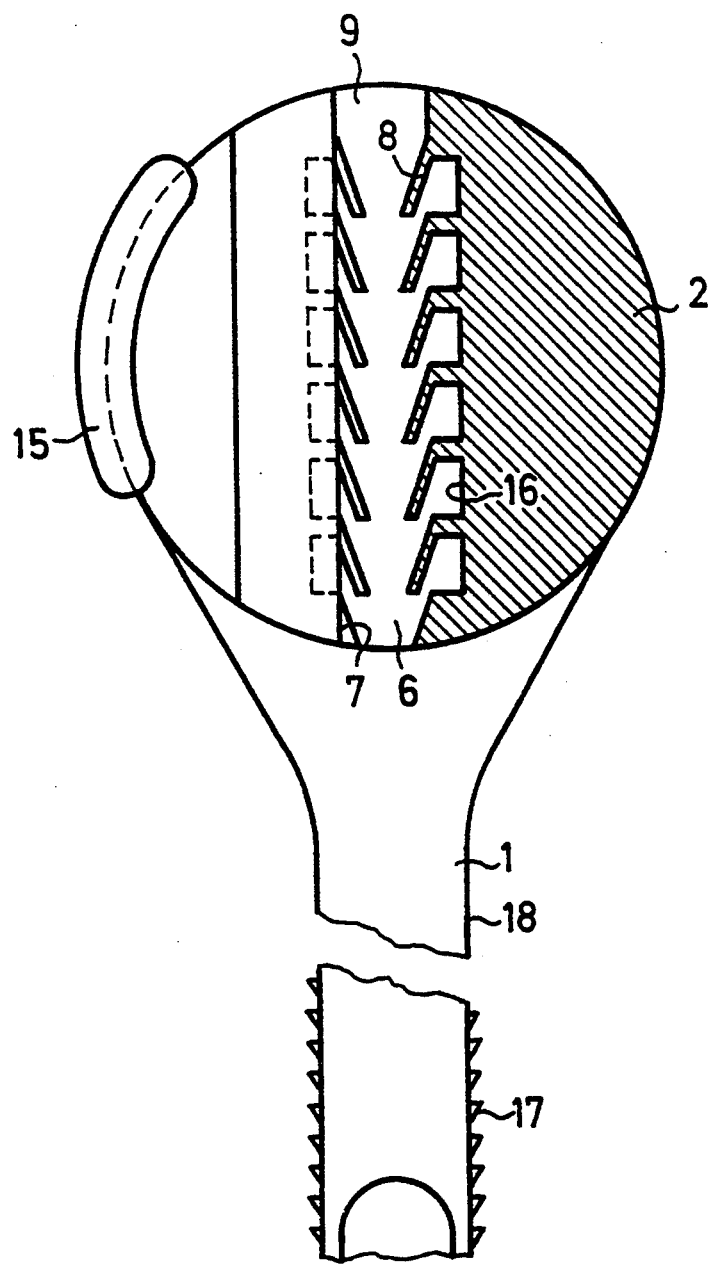
FIG. 6 A plan view of the holding head 2 in another embodiment.

Whereas in the embodiment shown in FIGS. 1 to 5 the tongues 8 are located on the bottom of the passage 9 facing the longitudinal slot 6 and engage on a rib system 12 positioned on a flat side of the band 1, in the embodiment of FIG. 6 the tongues 8 are positioned laterally in the passage 9. The view of FIG. 6 shows the holding head 2 half in section and half in plan view. On both narrow sides 16 of the passage 9 there are several successively arranged and identically constructed tongues 8, whose arrangement is mirror symmetrical to the longitudinal axis. In certain cases the arrangement of tongues 8 on a single narrow side 16 could be adequate.

The orientation of the tongues is the same as in the embodiment according to FIGS. 1 to 5.

As in the embodiment according to FIG. 6 the tongues 8 are positioned laterally, for improving holding or retaining the lateral edges 18 of the closing band 1 can have a rib system 17, which is once again preferably arranged on both lateral edges 18, i.e. the narrow sides of the cross-sectionally rectangular band 1.

I claim:

1. A closing band, comprising:
an elongated, flexible band having a ribbed portion and a narrower threading portion, said band having a free end for gripping, and having a holding head at an opposite end, said holding head providing a longitudinally extending channel with a top opening for laterally receiving the threading portion and with opposite end openings to allow the band to be moved longitudinally through the channel until the ribbed portion is positioned in the channel, and wherein the head forms a plurality of flexible, spaced tongues having web portions extending transversely to the channel, said web portions being spaced longitudinally along the channel, and said tongues having engagement portions being formed at an obtuse angle to said web portions for angling into said channel and engaging said ribbed portion within the channel, said head also forming yieldable retaining means alongside the channel such that the ribbed portion is retained in said channel against longitudinal forces but is removable from said channel through exertion of a force on the ribbed portion outwardly through the top opening of the channel.

2. A closing band according to claim 1, wherein the channel is constructed in such a way that the band therein runs roughly parallel to a portion of the band directly adjacent to the holding head.

3. A closing band according to claim 2, wherein the channel has a cross-section substantially corresponding to the cross-section of the ribbed portion of the band.

4. A closing band according to claim 1, wherein the tongues are arranged on one side wall of the channel.

5. A closing band according to claim 4, wherein the side wall of the channel facing the side wall with the tongues has a longitudinal slot running in the longitudinal direction of the band.

6. A closing band according to claim 1, wherein a gripping member is provided on the free end of the band.

7. A closing band according to claim 6, wherein behind the gripping member is formed the threading portion with a modified cross-section compared with the remainder of the band.

8. A closing band according to claim 1, wherein the length of the channel is greater than the width of the band.

9. A closing band according to claim 8, wherein the length of the passage is at least twice as large as the width of the band.

10. A closing band according to claim 1, wherein the tongues are arranged on at least one narrow side of the channel and ribs are arranged on at least one lateral edge of ribbed portion of the band.

* * * * *